June 28, 1955     B. C. SHARP     2,711,595

EDUCATIONAL DEVICE

Filed Sept. 10, 1952

INVENTOR.
BEULAH C. SHARP
BY
*John H. Widdowson*
ATTORNEY

United States Patent Office 2,711,595
Patented June 28, 1955

2,711,595

EDUCATIONAL DEVICE

Beulah C. Sharp, Wichita, Kans., assignor of fifty per cent to Opal C. Irwin, Sedgwick, Kans.

Application September 10, 1952, Serial No. 308,739

3 Claims. (Cl. 35—35)

This invention relates to education. In a more specific aspect this invention relates to educational means for teaching children phonetics.

I have invented an educational device which is very useful in teaching children of kindergarten age, usually between the ages of 3 to 6 years old. The educational device of my invention comprises, a base member upon which objects are pictorially illustrated in any suitable manner, such as by painting, printing, stamping, and the like. The base member has openings therein into which removable pieces or insert members fit. These insert members have objects and/or alphabetically depicted speech sounds illustrated thereon. The inserts fit into the openings in the base member. The beginning speech sound of the names of the objects depicted and the speech sound depicted alphabetically on the insert pieces are alike. The beginning speech sounds of the names of the objects pictorially illustrated on the base member are different than that beginning speech sound of the names of the objects and that alphabetically depicted on the insert pieces. Thus, the child using the device develops its thought processes and learns to associate speech sounds with objects and with alphabetical representation of speech sound, since the names of the removable objects have the same beginning speech sound and the removable alphabetically represented speech sound comes out with the removable object pieces. I find it advantageous to make the whole, that is the base member with inserts in place, portray a story. This has been found to further attract the child to use the device and thereby learn phonetics and to develop the ability to reason.

The educational device of my invention has many other advantages. Each device is self-checking, that is, only the objects associated with the same beginning phonetic sound are removable along with the removable piece upon which is depicted the letter or letters of the alphabet representing that speech sound. The device of my invention is something a child can manipulate with its hands, thus developing motor control. It can be used by kindergartners without adult supervision.

It is an object of my invention to provide education means.

It is another object of my invention to provide an educational device to teach small children that the names of different objects begin with the same speech sound and that not all names of objects begin with the same speech sound.

A further object of my invention is to provide an educational device to teach children that a combination of letters of the alphabet make one phonetic sound.

Still another object of my invention is to provide an educational device to teach kindergartners to associate beginning phonetic sound of the names of objects with an alphabetical representation of the phonetic sound, that is by a letter or letters of the alphabet.

Still a further object of my invention is to provide educational means the use of which by small children develops motor control.

Stilly other objects of my invention are to provide an educational device to give small children a feeling of enjoyment while learning, to help them observe and interpret a picture and to improve their visual discrimination.

Other objects and advantages of the apparatus of my invention will become apparent to one skilled in the art upon reading this disclosure.

The drawings which accompany and are a part of this disclosure depict a specific embodiment of the device of my invention as applied to the phonetic sound represented alphabetically by the letter C.

Fig. 1 of the drawings shows a plan view of this embodiment of the educational device of my invention with the removable pieces in place to form the whole.

Figure 1:
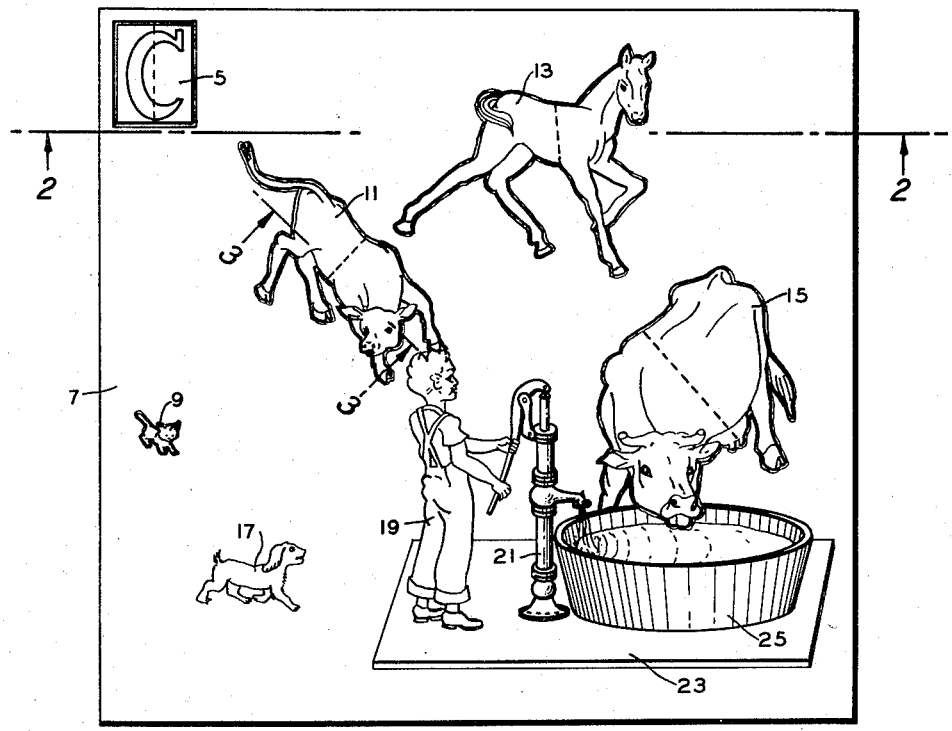

To further describe my invention reference will now be made to Figs. 1, 2 and 3 whereon the same reference numerals are used to indicate the same part and/or structure. It is to be understood that the following discussion is not to unduly limit the scope of my invention.

Insert member 5 with the letter C thereon is removable from base member 7. Cat 9, calf 11, colt 13 and cow 15 are pictorially illustrated on the corresponding insert members which are removable from base member 7. Dog 17, boy 19, pump 21, platform or base 23, and tub or watering basin 25 are pictorially illustrated on base member 7 and are not removable therefrom. The insert pieces, having the cat, calf, colt and cow pictorially illustrated on their front sides, all depict objects whose names begin with the same speech sound, and are removable from base member 7 along with the letter C, which alphabetically represents that speech sound. With the insert members in place the whole picture portrays a story, that of boy 19 pumping water into tub 25 and cat 9, dog 17, calf 11 and colt 13 going toward the tub, from which cow 15 is drinking, to get a drink. I find it desirable that a story be depicted no matter what speech sound is displayed alphabetically and pictorially by the educational device of my invention.

Backing member 27 is attached in any suitable manner to base member 7 and along with the openings in base member 7 forms receptacles for insert members 5, 9, 11, 13 and 15. Backing member 27 is not necessary, but is preferable, since it provides for storing the whole device, that is storage with the insert members in place. The loss of insert pieces is less.

The educational device of my invention can be and is preferably made of wood, single thickness or plywood; plastic; fiberboard; stiff and strong paperboard; metal; or other materials which will stand the hard wear and tear given by children using the device. Base member 7 and backing member 27 can be molded in one piece from plastic with the insert pieces made separately, if desired. I have found that base member 7 can conveniently be plywood with the insert pieces cut out of the plywood sheet, and another sheet of plywood can be used as backing member 27 attached by gluing same to the back of base member 7.

Figure 2:
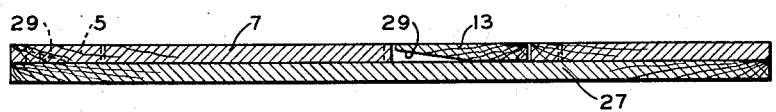
Fig. 2 is a cross-sectional view taken on line 2—2 of Fig. 1.
Figure 3:
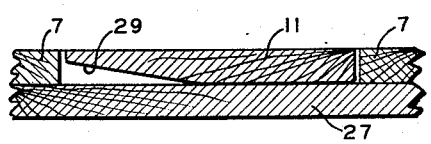
Fig. 3 is a cross-sectional view taken on line 3—3 of Fig. 1.

I find it desirable to bevel or cut-away the back or underneath side of the insert pieces, as shown at 29 in Figs. 2 and 3. The dotted lines on insert pieces 5, 9, 11, 13 and 15 indicate this beveling. The amount of beveling is such, that without pressure exerted on the insert pieces they will be flat and flush with the front surface of base member 7. Upon exerting pressure on the portion beveled the piece will tilt, raising the other portion above the surface of member 7 so that the insert pieces can be easily removed. This feature of the education device of my invention can be advantageously used whether a backing member 27 is used, or an available flat surface, such as a table or desk, is used to manipulate the device.

The educational device of my invention can be used with all single letters of the alphabet or two or more letters of the alphabet which alphabetically represent the beginning speech sound of names of objects. The following examples of the pictorial and alphabetical representation of the educational device of my invention, for the letters D and M, and the phonetic sounds represented by the letters Gr and Sh, are not to unduly limit the scope of my invention. The letters D, M, Gr and Sh are displayed on insert pieces in the manner of the letter C of the device shown in Figs. 1 and 2, for insertion into the base member of the device to which they apply.

For a convenient and useful embodiment of the letter D in the educational device of my invention, a Halloween night scene is pictorially illustrated by the whole of the base member and the insert pieces. Children are illustrated dressed in Halloween costumes, one dressed as a doctor, one a devil and one as a clown. They are going up a walk to a house to get treats. A little girl has come to the door of the house with her doll. The clown is being bucked off his donkey. A small dog is barking at them. The doll, doctor, devil, door, donkey and dog are pictorially illustrated on the insert pieces. The walk, house, girl and clown are pictorially illustrated on the base member.

For a convenient and useful embodiment of the letter M in the educational device of my invention, the whole of the pictorial illustrations on the removable pieces and the base portrays a small boy and his pet monkey which he took with him as he went to mail a letter at the corner mail box. The boy's mother had purchased milk at the corner store. A mouse, being chased by a cat, frightened the mother and the monkey. The monkey is in a tree with the boy's mitten. The boy with letter in hand is trying to coax him to come down. The milk and money, which the mother had dropped, is on the sidewalk. The mitten, monkey, mail box, mother, milk, money and mouse are pictorially illustrated on the insert pieces. The letter, store, cat and sidewalk are depicted on the base member.

For a convenient and useful embodiment of the phonetic sound Gr in the educational device of my invention, in the upper right-hand corner of the whole of the insert pieces and base is a greenhouse, with a grapevine growing in hedge form across the back. Large clumps of grass are on the left, and across the bottom is a strip of plowed ground. A goat which has entered through a gate in a fence has been stopped by a dog whose growls are depicted. A boy is depicted runnning in to help the dog. The removable objects are the grass, grapevine, greenhouse, ground and the growls from the dog. Those pictorially illustrated on the base are the goat, gate and fence, dog and boy.

For a convenient and useful embodiment of the phonetic sound Sh in the education device of my invention, the picture portrayed by the whole of the inserts and base member shows a sidewalk leading to a clothesline. A boy and a girl are shown playing with their shadows on the sidewalk. The clothesline has a wash hanging on it, including a sheet and a shirt. On grass behind the clothesline are two sheep. The two sheep, two shadows, sheet and shirt are pictorially illustrated on insert pieces. The sidewalk, clothesline, boy, girl, grass and those things of the wash not having names beginning with the speech sound Sh are illustrated on the base member.

As will be evident to those skilled in the art, various modifications of my invention can be made, or followed, in the light of this disclosure and discussion, without departing from the spirit or scope of the disclosure or from the scope of the claims.

I claim:

1. An educational device which comprises, in combination: a base member having pictorial illustrations of a plurality of different objects on its front side, said base member having a plurality of openings therein, each of said openings having a different outline; a plurality of inserts, each of said inserts having a different shape and fitting into one of said openings in said base member having a corresponding outline, one of said inserts having a speech sound depicted alphabetically thereon, each of said other inserts having a pictorial illustration of a different object thereon having a name beginning with said speech sound, said speech sound being different than the beginning speech sound of all of the names of said objects pictorially illustrated on said base member, and all of said pictorially illustrated objects on said base member and said inserts together portraying a story; a flat backing attached to said base member on its back side, forming with said openings in said base member receptacles for said inserts; and said inserts being beveled on their back sides in such manner that said inserts can be tilted in said receptacles from a normal position of their front sides being flush with said front side of said base member.

2. An educational device, comprising, in combination, a base member having pictorial illustrations of objects thereon and openings therein, removable insert members of a shape to fit into said openings having pictorial illustrations of objects thereon that have names beginning with the same speech sound, said insert members being partially cut-away on their back sides to be tiltably mountable in their respective openings in said base member to aid in removing said insert members from said base member, and said objects pictorially illustrated on said base mmber having names beginning with different speech sounds than said speech sound of said objects depicted on said inserts.

3. An educational device, comprising, in combination, a base member having pictorial illustrations of objects thereon and at least two openings therein, removable insert members having shapes corresponding to outlines of said openings and fitting therein, said insert members being bevelled on their back sides in such manner that said inserts can be tilted from a normal position of their front sides being flush with the front side of said base member, one of said insert members having a speech sound depicted alphabetically thereon, and another of said insert members having a pictorial illustration of an object thereon having a name beginning with said speech sound, and said objects pictorially illustrated on said base member having names beginning with speech sounds different than said speech sound depicted alphabetically on said insert member.

References Cited in the file of this patent

UNITED STATES PATENTS

| | | |
|---|---|---|
| 1,273,763 | Garman | July 23, 1918 |
| 1,354,910 | Ketchum | Oct. 5, 1920 |
| 1,394,620 | Haupt | Oct. 25, 1921 |
| 1,681,759 | Appley | Aug. 21, 1928 |
| 1,735,456 | Garman | Nov. 12, 1929 |
| 1,755,853 | Waring | Apr. 22, 1930 |
| 2,361,154 | Schoolfield | Oct. 24, 1944 |
| 2,444,768 | Eby | July 6, 1948 |